(No Model.)
J. H. YOUNGKEN.
MECHANICAL MOVEMENT.
No. 590,929. Patented Sept. 28, 1897.
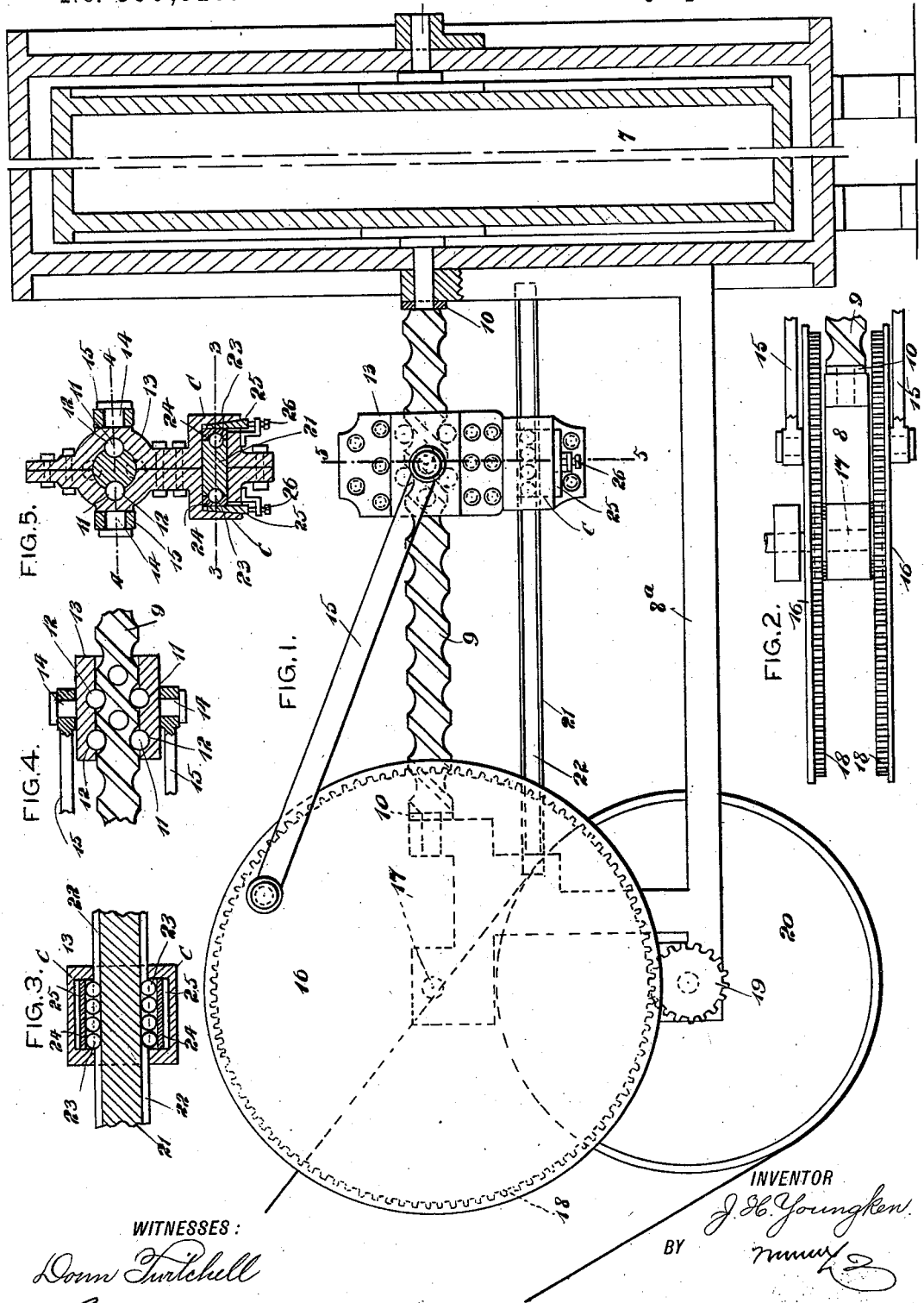
WITNESSES:
INVENTOR
J. H. Youngken.
BY
ATTORNEYS.

UNITED STATES PATENT OFFICE.

JOHN H. YOUNGKEN, OF BUTTE, MONTANA.

MECHANICAL MOVEMENT.

SPECIFICATION forming part of Letters Patent No. 590,929, dated September 28, 1897.

Application filed October 19, 1896. Serial No. 609,350. (No model.)

*To all whom it may concern:*

Be it known that I, JOHN H. YOUNGKEN, of Butte, in the county of Silver Bow and State of Montana, have invented a new and Improved Mechanical Movement, of which the following is a full, clear, and exact description.

The invention relates to mechanical movements of that class by which a reciprocating movement is transformed into a reversing rotary movement.

The invention embodies a peculiarly-constructed cross-head and a rotary threaded shaft passed through the cross-head, together with means for reciprocating the cross-head on the shaft.

The invention consists in certain features of construction and combinations of parts, which will be fully described hereinafter and then defined in the claims.

Reference is to be had to the accompanying drawings, forming a part of this specification, in which similar characters of reference indicate corresponding parts in all the figures.

Figure 1 is a side elevation of the invention with a part in section. Fig. 2 is a fragmentary plan view thereof. Fig. 3 is a sectional view on the line 3 3 of Fig. 5. Fig. 4 is a sectional view on the line 4 4 of Fig. 5, and Fig. 5 is a sectional view on the line 5 5 of Fig. 1.

The invention is adapted to that class of machinery in which it is desired to impart an alternating rotary movement—that is to say, a rotary movement in one direction for a predetermined length of time and then a reverse movement for a similar length of time.

I have shown the invention in connection with a washing-machine, but it is obvious that this is merely an example of its use.

In the drawings the outer cylinder 6 of the washing-machine is rigidly mounted on a suitable frame and carries the inner cylinder 7, which turns on an axis 8. Secured to the left-hand head of the cylinder 6 is an approximately U-shaped frame 8ª, comprising a horizontal portion and an upwardly-extending part at each end, the right-hand upwardly-extending part being secured to one head of the cylinder 6. Revolubly mounted within the upper extremities of the upwardly-extending portions of the frame 8ª is a shaft 9, the terminals of which are reduced so as to fit within bearings in the frame 8ª and the right-hand terminal of which shaft is rigidly connected with or forms part of the left-hand trunnion 8 of the cylinder 7. Hardened-steel washers 10 are interposed between the respective ends of the shaft 9 and the bearings in which the reduced terminals of said shaft are mounted. These washers 10 serve to take up the friction which would otherwise exist between the ends of the shaft 9 and the respective bearings therefor.

The shaft 9 is provided with two spiral grooves running throughout its length and forming a continuous thread. These grooves in the present example receive two circles of antifriction-balls 11, which are carried in recesses 12, formed in the cross-head 13. The cross-head 13 is formed in two duplicate sections, rigidly connected by transverse bolts, and each having a semicircular groove in its upper portion, which grooves match to form a rounded passage receiving the shaft 9. The lower ends of each section of the cross-head have an outwardly-extending portion *c*.

The balls 11 may be four in number, if desired, but in large machinery it is desirable to have them increased to eight or more, so that the strain may be more evenly distributed. Outrunning laterally from each side of the cross-head or block 13 is a trunnion 14, to which the two pitmen 15 are connected and by which movement is transmitted to the cross-head. The pitmen 15 are pivoted to the disks 16, mounted on an axis 17, (see dotted lines in Figs. 1 and 2,) carried by the left-hand upwardly-extending portion of the frame 8ª. The disks 16 lie on each side of the shaft 9 and on each side of the said upwardly-extending portion of the frame 8ª. Formed integral with or rigidly secured to the peripheries of the disks 16 are cog-teeth 18, meshing with pinions 19, fixed to the axis of the drive-pulley 20.

It will be seen that movement transmitted to the drive-pulley 20 will be in turn transmitted to the disks 16 and thence transformed to a reciprocating movement in the cross-head 13. This reciprocation of the cross-head will, through the coöperation of the grooves in the shaft 9 and the balls 11, turn the shaft in one direction as long as the cross-head is not reversed. When, however, the revolution of the disks 16 causes the cross-head to be turned back, the direction in which the shaft 9 turns will also be reversed. This operation will be continued until the cross-head is again moved in the first-named direction, whereupon a second reversal of the shaft 9 will be effected.

It will be seen that the return or reversal of the cross-head is effected when the pivots between the parts 16 and 15 are horizontally alined with the axis of the disks 16. This relative arrangement of parts assures the necessary decrease in speed of the cross-head 13 when the movement is changed to prevent any unnecessary jar or strain on the machinery which would be occasioned were the stoppage of the cross-head made instantaneous. When the pitmen 15 are raised above the axis of the disks 16 or lowered below the axis, the cross-head will move very fast, and when in this position will be at an intermediate portion of the shaft 9.

Extending parallel with the shaft 9 and directly below the same is a guide-bar 21, having in each side a groove 22. This groove 22 partly receives the balls 23, carried by the outwardly-extending portions $c$ of the sections of the cross-head 13. The portions $c$ of the cross-head are each provided with a longitudinally-extending passage matching with and adapted to receive the bar 21. Communicating with each passage of the parts $c$ of the cross-head are outwardly-extending cavities receiving the blocks 24, each of which blocks is provided with a semicircular groove on its inner side, these grooves receiving the balls 23. In assembling these parts the blocks 24 are placed within the cavities of the parts $c$ of the cross-head 13, and the balls 22 are placed within the grooves of the blocks 24, and the cross-head is then passed over the guide-bar 21. It is now necessary to move the blocks 24 inward and hold them in such position, as shown in Figs. 3 and 5. To do this, I provide wedges 25, which lie between the outer walls of the cavities in the parts $c$ of the cross-head 13 and the outer sides of the blocks 24. Set-screws 26, supported from the cross-head, operate to push the wedges 25 upward, whereby the blocks 24 are moved inward and the parts held in operative position. These devices serve to hold the cross-head squarely and truly on the shaft 9 and prevent the cross-head from moving unevenly on the shaft. As shown in Fig. 3, the cavities in the parts $c$ of the cross-head 13 are closed at their front and rear sides to prevent the balls 23 from being displaced.

From the above description it will be seen that my invention involves an apparatus by which reciprocating movement may be transformed into alternating rotary movement with very great ease and without unusual wear and strain on the moving parts.

It will also be understood that the movement is adapted to all classes of machinery, and of course is not limited to the particular use in connection with which it is here shown.

Having thus fully described my invention, I claim as new and desire to secure by Letters Patent—

1. The combination of a rigid guide-bar having grooves in its side edges, a rotary shaft having a spiral groove running throughout its length, a cross-head formed in two sections and provided with passages respectively receiving the shaft and the guide-bar, an antifriction-ball arranged within the passage receiving the shaft and projecting into the groove of the shaft, blocks located within the second passage and having lateral movement within the passage and toward and from the guide-bar, an antifriction-ball held by each block, the said balls projecting into the grooves of the guide-bar, and a wedge pressing each block toward the guide-bar, substantially as described.

2. The combination of a revoluble shaft having a spiral groove, a stationary guide-bar held parallel with the shaft, a cross-head having two openings respectively receiving the shaft and guide-bar, and an antifriction-ball held within the cross-head and projecting into the groove of the shaft whereby, upon the reciprocation of the cross-head, an alternating rotary movement is transmitted to the shaft, substantially as described.

JOHN H. YOUNGKEN.

Witnesses:
WILLIAM M. WILSON,
WILLIAM D. RUMSEY.